United States Patent
Wu et al.

(10) Patent No.: US 8,848,495 B1
(45) Date of Patent: Sep. 30, 2014

(54) PLASMON GENERATOR SELF-ANNEALING WITH CURRENT INJECTION IN TAMR

(71) Applicant: Headway Technologies, Inc., Milpitas, CA (US)

(72) Inventors: Yan Wu, Cupertino, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/093,993

(22) Filed: Dec. 2, 2013

(51) Int. Cl.
*G11B 11/24* (2006.01)

(52) U.S. Cl.
USPC .......................................... 369/13.33

(58) Field of Classification Search
None
See application file for complete search history.

(56) References Cited

U.S. PATENT DOCUMENTS

| | | | |
|---|---|---|---|
| 7,483,291 B2 | 1/2009 | Saito et al. | |
| 8,488,419 B1 * | 7/2013 | Jin et al. | 369/13.32 |
| 2003/0175554 A1 | 9/2003 | Miyakoshi | |
| 2008/0013222 A1 | 1/2008 | Okuno et al. | |
| 2009/0303489 A1 * | 12/2009 | Allsop et al. | 356/445 |
| 2011/0110202 A1 * | 5/2011 | Komura et al. | 369/13.56 |
| 2011/0176398 A1 * | 7/2011 | Tanaka et al. | 369/13.33 |
| 2011/0181979 A1 * | 7/2011 | Jin et al. | 360/59 |
| 2011/0205860 A1 * | 8/2011 | Chou et al. | 369/13.24 |
| 2011/0216635 A1 * | 9/2011 | Matsumoto | 369/13.33 |
| 2011/0222190 A1 * | 9/2011 | Hara et al. | 360/234.6 |
| 2011/0228419 A1 * | 9/2011 | Tanaka et al. | 360/59 |
| 2011/0286128 A1 * | 11/2011 | Tsutsumi et al. | 360/59 |
| 2011/0303637 A1 * | 12/2011 | Araki et al. | 216/24 |
| 2012/0120781 A1 * | 5/2012 | Komura et al. | 369/13.33 |
| 2012/0147717 A1 * | 6/2012 | Shimazawa et al. | 369/13.33 |
| 2012/0230168 A1 * | 9/2012 | Izawa et al. | 369/13.32 |
| 2013/0215725 A1 * | 8/2013 | Hirata et al. | 369/13.17 |

* cited by examiner

*Primary Examiner* — Peter Vincent Agustin
(74) *Attorney, Agent, or Firm* — Saile Ackerman LLC; Stephen B. Ackerman (57) ABSTRACT

A dual plasmon generator (PG) mirror image structure is used during fabrication of a TAMR head to locally anneal the PGs without substantially elevating the temperature in adjacent layers. Two PGs have narrow peg portions aligned head to head, and larger back end portions with a back side facing away from the eventual ABS. A first lead is attached to a back side of a first PG while a second lead is connected to a back side of a second PG. A 10 mA current is injected into a first PG and exits from the second PG and causes resistive heating in the rod-like portions where the temperature may be raised by 250° C. or more. A temporary overcoat layer may be formed over the PGs to dissipate heat and to keep the PGs from deforming during the annealing step.

30 Claims, 6 Drawing Sheets

PLASMON GENERATOR SELF-ANNEALING WITH CURRENT INJECTION IN TAMR

RELATED PATENT APPLICATION

This application is related to U.S. Pat. No. 8,488,419; assigned to a common assignee and herein incorporated by reference in its entirety.

TECHNICAL FIELD

The present disclosure relates to magnetic read/write heads based on thermally assisted magnetic recording (TAMR), and in particular to a structure and method in which a peg portion of a plasmon generator (PG) is locally annealed to improve thermal robustness of the peg and enhance performance of the PG during a write process.

BACKGROUND

Conventional magnetic recording is generally considered to be limited to areal densities below about 1 Terabit/in$^2$ where the bit dimension is around 20 to 25 nm. The fringing effect from the magnetic pole requires the pole width to be essentially dimensionless (zero width) in order to have the erasure width as small as the bit. This condition is certainly impossible to accomplish and thus assisted magnetic recording is needed to achieve a higher areal density. TAMR is expected to be one of the future generations of magnetic recording technologies that will enable recording at ~1-10 Tb/in$^2$ data densities. TAMR involves raising the temperature of a small region of the magnetic medium to above its Curie temperature where both of its coercivity and anisotropy are virtually eliminated so that magnetic writing becomes easier to achieve even with weak write fields characteristic of small write heads in high recording density schemes. The recording transition is written with the magnetic field generated by the magnetic pole and then the media is cooled down so the written signal is stored. Very quick thermal heating and cooling is required to limit the heat-affected zone so the adjacent track/bits will not suffer erasure. In TAMR, optical power from a light source, typically a laser diode (LD) mounted on the slider, is converted into localized heating in a recording medium. Thus, with a sharp temperature gradient of TAMR acting alone or in alignment with a high magnetic field gradient, data storage density can be further improved with respect to current state of the art recording technology.

In addition to the components of conventional write heads, a TAMR head also typically includes an optical waveguide (WG) and a plasmon generator (PG). The waveguide serves as an intermediate path to guide the external laser light to the PG where the light optical mode couples to the propagating plasmon mode of the PG. After the optical energy is transformed to plasmon energy with energy transmission along the PG, it is concentrated at the medium location where heating is desired. Ideally, the heating spot is correctly aligned with the magnetic field from the write head to realize optimum TAMR performance. However, the intense heat generated by the PG tends to cause performance degradation within a short period of time. Also, the high temperature along the PG surface during the write process creates a reliability problem with the PG material that is usually a noble metal such as Au or Ag. Failure analysis shows a PG shape change and a deep recession in one or more PG surfaces.

There is an urgent need to develop a methodology that can improve the thermal robustness of the PG. High temperature deposition has been attempted but presents a new issue since the entire deposition chamber is at an elevated temperature that exceeds the blocking temperature of IrMn or other antiferromagnetic materials in the AFM layer used to fix the pinned layer magnetization direction in the sensor element of the adjoining read head. Laser annealing provides more localized heating. However, optical reflection of laser light from many materials in the recording head can lead to other problems. Thus, a new concept of improving PG reliability is needed that does not degrade other components in the TAMR write head or in the adjoining read head.

SUMMARY

One objective of the present disclosure is to provide a structure for localized annealing of a plasmon generator (PG) in a TAMR device so that the PG is stable during subsequent write processes at normal operating temperatures and improved device reliability is realized.

A second objective of the present disclosure is to provide a method for localized annealing in a plurality of PG in an array of TAMR devices on a slider so the annealing process is performed with high throughput.

These objectives are realized in various embodiments of the present disclosure wherein a TAMR write head structure includes a write pole that has a plasmon generator (PG) formed proximate to a leading edge of a write pole tip region along the ABS. The plasmon generator extends a certain distance along a surface of the write pole towards the back end of the device. There is also an optical waveguide that is formed on an opposite side of the PG with respect to the write pole wherein the waveguide extends from the ABS in a lengthwise direction perpendicular to the ABS and parallel to a side of the plasmon generator. The waveguide captures light from a light source near the back end of the device and propagates the light toward the ABS. A portion of the light energy is transferred to the plasmon mode along the PG by evanescent coupling and is then propagated to the ABS through a metal rod-like portion in the PG before being projected onto a magnetic medium for spot heating during a write process. According to one embodiment, a bottom surface of the waveguide that faces away from the PG adjoins a pedestal section of a return pole. The return pole may also serve as the top shield in the read head in the TAMR device.

The PG is comprised of a first portion with a rod-like shape that has an end called a peg at the ABS. The rod extends in a lengthwise direction perpendicular to the ABS and a bottom side is separated from the waveguide by a first gap distance. A top side of the peg is a second gap distance from a leading edge of the write pole at the ABS. A second larger portion of the PG structure is recessed from the ABS by 5 to 150 nm and has a triangular or parabolic shaped portion connected to the peg portion from a top-down view. A bottom surface of the rod-like portion may be formed along the same plane as a bottom surface of the parabolic shaped portion. The back end of the parabola shaped portion may be rectangular shaped with two sides formed substantially perpendicular to the ABS. The parabola shaped portion has a greater width in a cross-track direction and a greater thickness in a down-track direction than the rod-like layer. The entire PG may be made of a noble metal such as Ag, Au, Cu, or an alloy thereof including AuCo to ensure high optical transmission.

The bottom surface of the PG couples optical energy from the waveguide into surface plasmon (SP) through evanescent coupling. At the ABS, the SP mode is confined around the free standing rod portion (peg) that is surrounded by dielectric cladding and heats the media locally while the head flies over the media surface. The spot size of the SP mode on the media depends on the dimension of the peg, the spacing between the ABS and media recording layer, and thermal properties of the media layers. Optical spot size can be scaled down by reducing one or both of the cross-track and down-track dimensions of the peg at the ABS.

A key feature of the present disclosure is a structure and method used to anneal the rod-like portion of the PG without substantially elevating the temperature in other layers in the TAMR device. In particular, a temperature that exceeds the operating temperature of the final device is confined to the rod-like portion of the PG, and preferably to a front section including an end at the ABS. The anneal step is performed after the waveguide and PG are sequentially formed on the pedestal of the return pole and prior to deposition of the write pole in the TAMR fabrication sequence where there is a leading magnetics structure. To accomplish the localized annealing, a dual PG mirror image configuration may be employed wherein two PGs are joined head to head along a plane that approximates the eventual ABS position. One lead is attached to a back end of the parabola shaped portion of a first PG while a second lead is attached to a back end of a second PG to allow a current to flow through a middle section that comprises the two rod-like portions of the plasmon generators. This step may be performed simultaneously on a plurality of plasmon generators in the array of TAMR devices on a slider to increase throughput. For example, leads from each PG may be attached to a writer pad (W+) in a circuit design. Thereafter, an overcoat layer made of silicon oxide or tantalum oxide, and with a conformal thickness of about 1 micron is deposited on the slider to cover the plurality of TAMR devices. A DC current or a pulsed current is injected via a lead into the first PG and exits from a second PG by a second lead thereby causing resistive heating in the rod like portions and effectively increases the temperature therein to about 275° C. or higher depending on the cross-sectional area of the rod-like portions and the current magnitude. Typically, a current of around 10 mA applied for 1 minute up to about 2 hours is sufficient to raise the temperature of the rod-like portions by 250° C. considering a temperature coefficient of resistivity (TCR) for Au of 0.12%/degree. Preferably, the rod-like portions in a plurality of PG structures are heated to a temperature that exceeds the expected operating temperature of the final TAMR device.

Following the anneal step, the overcoat layer may be removed by a selective etch. In one embodiment, a $CF_4$ reactive ion etch is used to remove the overcoat of silicon oxide or tantalum oxide but does not attack the aluminum oxide cladding layer surrounding the base of the peg portion. Then the leads are removed and a conventional sequence of processes similar to those employed in fabricating perpendicular MR heads may be performed to form the main pole and overlaying layers in the TAMR write head.

DETAILED DESCRIPTION

The present disclosure is a TAMR device wherein a write head structure has a leading magnetics scheme with a waveguide and plasmon generator formed between a leading side of the write pole and a return pole, and at least a portion of the PG adjoining the ABS is selectively annealed. However, the plasmon generator annealing concept described herein may also be incorporated in a trailing magnetics structure as appreciated by those skilled in the art. During an intermediate step in the TAMR head fabrication sequence, the rod-like portion of the PG is annealed by injecting a current in a back end of the PG. The intermediate write head structure has leads from a power source that are connected to ends of two plasmon generators in a mirror image design. A temporary overcoat layer on the TAMR device is used to provide rigidity to the PG and enable heat dissipation during annealing. The rod-like portion of each PG is also referred to as a peg. Although the exemplary embodiments depict a back end portion of the PG as having a parabola shape, the present disclosure also encompasses other plasmon generator designs where a back end portion with a first volume adjoins a front end rod-like portion having a second volume substantially less than the first volume. The terms surface and side may be used interchangeably when referring to a TAMR component such as a waveguide or PG. A top surface of a TAMR component is defined as a side that is facing the write pole layer. The TAMR write head as described herein may be part of a combined read head/write head design where the return pole for the write head also serves as a top shield in the read head.

Figure 1:
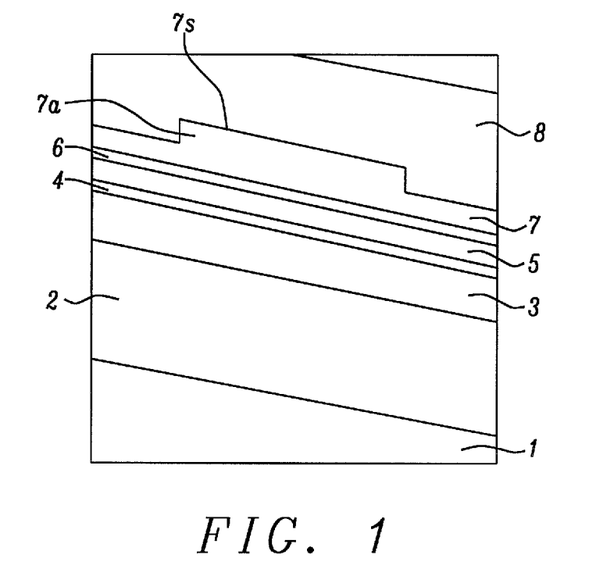
FIG. 1 is a cross-sectional view of a TAMR head along an ABS.

Referring to FIG. 1, an ABS view of a TAMR head is illustrated according to one embodiment of the present disclosure. There is an undercoat layer 2 that is typically an insulator material formed on a substrate 1 made of AlTiC, for example. A S1 shield 3 is formed on the undercoat layer. Above the bottom shield is a gap layer 4 that contains a magnetoresistive sensor (not shown). A S2a/S2b shield 5 is disposed on the gap layer. An insulator layer 6 and return pole 7 are sequentially formed on the S2a/S2b shield. In one aspect, the return pole has a pedestal design that features a pedestal 7a protruding in a direction away from read head layers 2-6. A top surface 7s of the pedestal is shown facing away from the substrate 1. A lead shield 8 adjoins a top surface of the pedestal.

Figure 2:
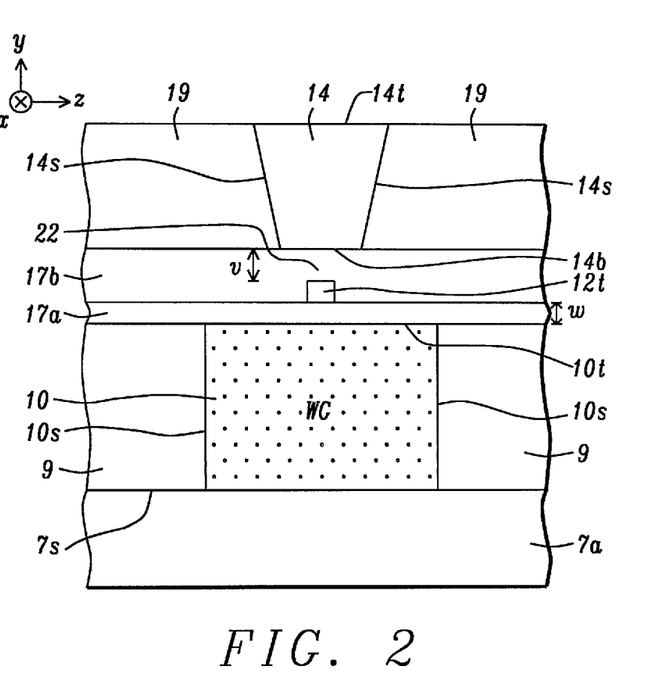
FIG. 2 is an ABS cross-sectional view of a TAMR write head including a write pole, plasmon generator (PG), and waveguide (WG) according to an embodiment of the present disclosure.

In FIG. 2, an ABS view is shown of an enlarged section of the TAMR write head with lead shield removed. According to one embodiment, a waveguide 10 contacts a top surface 7s of the pedestal. Above the waveguide is a PG with a peg surface 12t facing the ABS, and a write pole 14 with a bottom surface 14b that is a leading side of the write pole during a write process. In this drawing, the y-axis represents the down-track direction, the z-axis is the cross-track direction, and the x-axis extends in a direction perpendicular to the ABS towards a back end of the device. The sizes of the waveguide, PG, and write pole are not necessarily drawn to scale since the purpose of the drawing is to show the placement of the optical components of the TAMR head in relation to the magnetic return pole and write pole.

The waveguide has two side surfaces 10s that extend perpendicular to the ABS in a lengthwise direction toward a back end of the device, and a top surface 10t. An insulation layer 9 is formed along both sides of the waveguide. Above the waveguide is a first cladding layer 17a that is preferably made of an insulator material such as aluminum oxide. The first cladding layer forms a first gap with a thickness w of about 5 to 50 nm between the peg end 12t and waveguide surface 10t. On the first cladding layer is a second cladding layer 17b that adjoins the side surfaces and top surface of the peg and thereby forms a second gap 22 with a thickness v between the peg end 12t and write pole surface 14b. The second cladding layer may be comprised of the same insulator material as in the first cladding layer. The write pole usually has a trapezoidal shape wherein two sides 14s connect leading surface 14b to a trailing surface 14t such that the trailing surface has a greater cross-sectional width (track width) at the ABS than the leading surface. A gap layer 19 comprised of an insulator material adjoins the sides of the write pole. A shield structure that includes side shields, and a trailing shield above trailing surface 14t is not pictured in order to simplify the drawing and focus attention on the key feature that is the optical design including PG and waveguide. However, the present disclosure anticipates one or more shields may be used to control the track width during the write process while retaining the benefits of the annealing scheme described in the exemplary embodiments. The present disclosure also anticipates that heat sinks may be formed adjacent to the write pole sides as shown in related U.S. Pat. No. 8,488,419.

Figure 3:
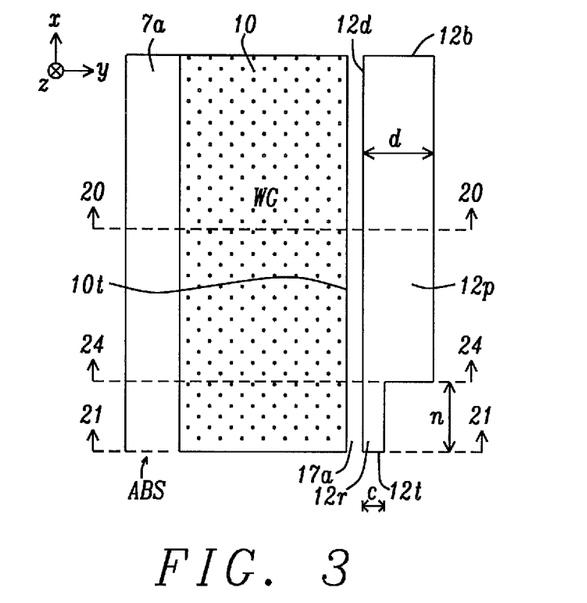
FIG. 3 is a down-track cross-sectional view of the TAMR write head structure in FIG. 2 that shows the PG is comprised of a rod-like portion at the ABS and a thicker back end portion.

Referring to FIG. 3, the PG is comprised of two portions 12r, 12p that in one embodiment are made of the same non-magnetic metal or alloy such as Au, Ag, Cu, or AuCo. Alternatively, the back end portion 12p may be a noble metal or alloy for high optical transmission while the front end or peg portion 12r may be comprised of Ru, Cr, Pd, Pt, Ti, W, Ta, Fe, Co, Ni, or alloys thereof to provide low atom mobility, good thermal robustness and mechanical hardness, and superior resistance to corrosion as described in related U.S. Pat. No. 8,488,419. Peg portion 12r preferably has a square or rectangular shape from a cross-sectional view along a cross-track direction and extends from an end 12t at the ABS 21-21 for a distance n of about 5 to 150 nm in an x-axis direction where a second end adjoins a front end of the back end portion 12p along a plane 24-24 which is parallel to the ABS. A surface of the peg portion facing the waveguide 10 may be formed along the same plane as bottom surface 12d of the back end portion.

The peg portion has a smaller thickness c in a down-track direction than the down-track thickness d in the back end portion of the PG. Preferably, the d/c thickness ratio is from 2:1 to 5:1.

Figure 4:
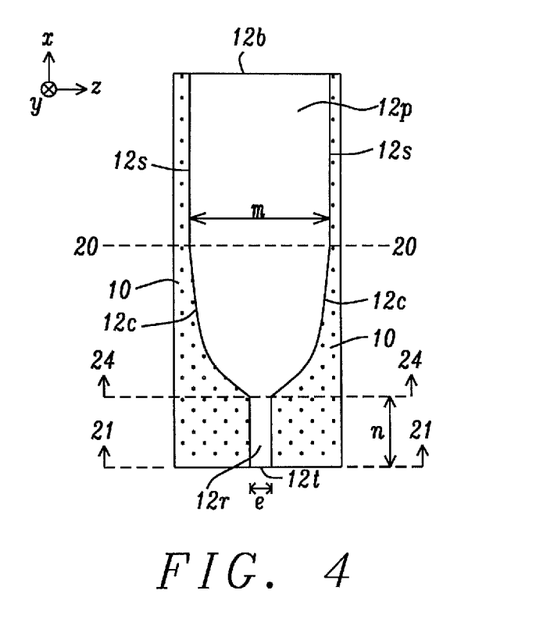
FIG. 4 is a top-down view of the PG structure in FIG. 3 and depicts the thicker back end portion of the PG as having a parabola shape according to one embodiment of the present disclosure.

Referring to FIG. 4, a top-down view of the PG is shown with gap layer 17a removed in order to illustrate the overlay of the PG on waveguide 10. In the exemplary embodiment, the back end portion 12p is shown with a parabola shape and has a substantially larger volume than that of the rod-like portion 12r with a rectangular shape due to a larger down-track thickness as described previously and a greater cross-track width m where m>e. In other words, curved sides 12c become farther apart as the distance from the plane 24-24 increases. In one aspect, the curved sides extend from plane 24-24 to a plane 20-20 that is parallel to the ABS. The back end portion also includes sides 12s that continue from plane 20-20 to a back end 12b of the PG. Although sides 12s are depicted as substantially parallel to the x-axis, the present invention also anticipates that the sides may diverge with increasing distance from their connecting points with sides 12c at plane 20-20 so that the cross-sectional width between sides 12s along plane 20-20 is less than along the back side 12b. The rod-like portion has a cross-section width e that may be greater than or less than down-track thickness c to give a rectangular shape for end 12t. End 12t may also have a square shape from an ABS view as depicted in FIG. 2 where e=c.

Figure 5:
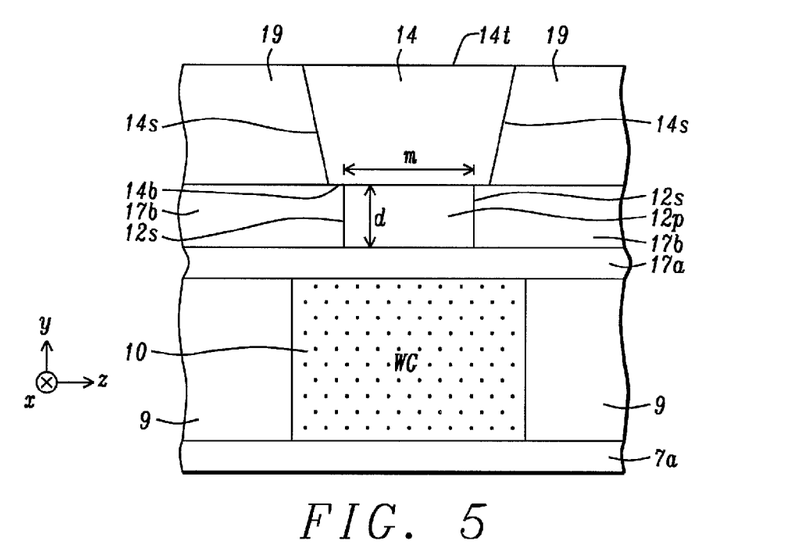
FIG. 5 is a cross-sectional view of the TAMR write head structure along the plane 20-20 in FIG. 4.

Referring to FIG. 5, a cross-sectional view of one embodiment of a TAMR write head structure according to the present disclosure is shown along the plane 20-20 in FIG. 4 and retains the same features as described with respect to FIG. 2 except the back end portion 12p of the PG is shown with a top surface adjoining a bottom surface 14b of the write pole. Sides 12s of the back end portion are aligned essentially parallel to the down-track direction and terminate at a top surface of first cladding layer 17a. The cross-sectional width m of the back end portion is typically greater than the down-track thickness d. Cladding layers 17a, 17b are preferably made of a dielectric material having a low refractive index such as alumina or $MgF_2$ to optimize transmission of the surface plasmon (SP) mode along sides 12s and bottom surface 12d. As the SP mode approaches the ABS (not shown), the SP mode is confined to a narrow region around the sides of rod-like portion 12r and thereby concentrates plasmon energy at end 12t during a write process. The PG is an excellent optical transmission material and suppresses all but the fundamental SP mode propagating along the back end portion 12p and converging on the rod-like portion 12r at the ABS.

Figure 6:
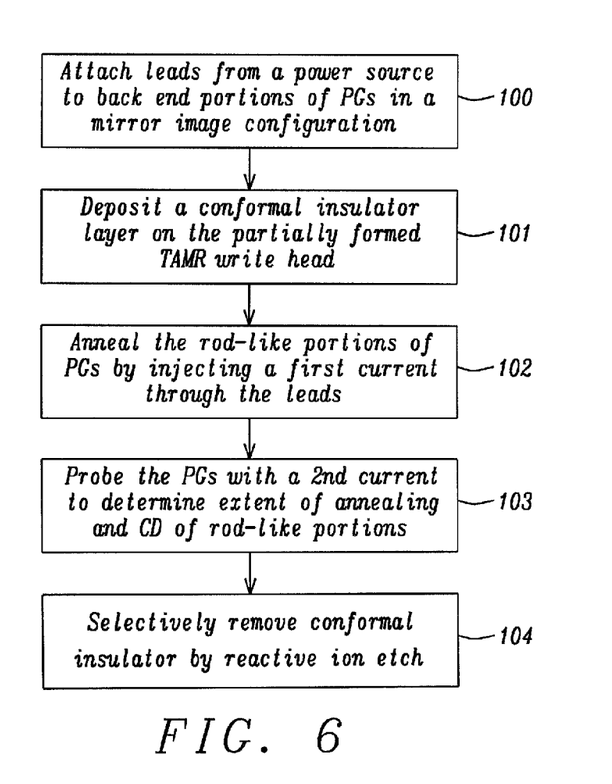
FIG. 6 is a flow diagram that lists the steps in a process sequence of the present disclosure where a rod-like portion of a PG is locally annealed.
Figure 7:
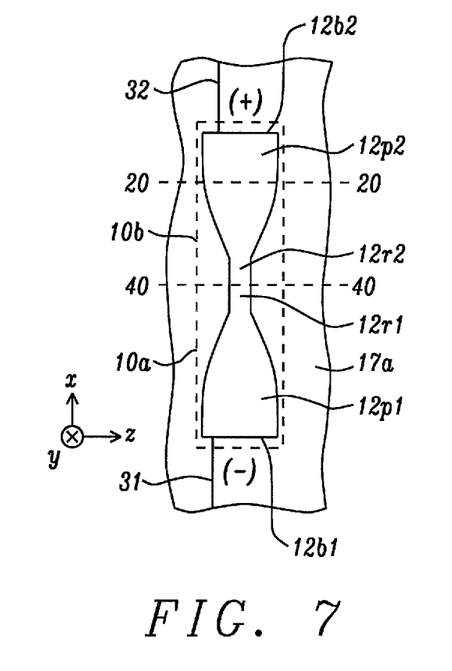
FIG. 7 is a top-down view of a dual PG mirror image configuration showing a first lead attached to a back end portion of a first PG and a second lead attached to a back end portion of a second PG according to an embodiment of the present disclosure.

Referring to FIG. 6, a flow chart is provided to illustrate a process sequence according to the present disclosure where a rod-like portion of a PG is locally annealed without substantially raising the temperature in other parts of the TAMR head. The process sequence begins after the waveguide and PG are sequentially formed in a leading magnetics scheme according to a conventional process. A description of a process flow for forming a waveguide and overlying PG is provided in related U.S. Pat. No. 8,488,419 and is not included here. Preferably, two PGs and underlying TAMR head layers are aligned head to head along a plane 40-40 in a mirror image configuration as depicted in FIG. 7. It should be understood that the slider will eventually be cleaved along the plane 40-40 to generate two PGs from each mirror image structure, and said plane roughly approximates an ABS until a permanent position for the ABS is determined in a final lapping step as appreciated by those skilled in the art. Furthermore, there is an array of TAMR heads on a slider which means the configuration in FIG. 7 is repeated a plurality of times in rows and columns across the slider. The structure in FIG. 7 will be described in more detail in a later section.

Returning to the process sequence in FIG. 6, a lead is attached to a back end portion of each PG in a TAMR array in step 100. A first lead is attached to a back end of one PG that represents a positive terminal in the mirror image configuration (FIG. 7) while a second lead is attached to a back end of a second PG that represents a negative terminal. As a result, a current may be injected in a subsequent step at the back end of the first PG and flows out the back end of the second PG as described in step 102. The leads are connected to a power source such as a writer pad (W+). In the following step 101, an overcoat layer is deposited on the slider with the TAMR head array and preferably is a conformal coating with a uniform thickness of approximately 1 micron. Next in step 102, a first current is injected through the mirror image structure and selectively anneals the rod-like portions $12r1$, $12r2$ because of their substantially smaller volume and greater resistive heating than in the back end portions $12p1$, $12p2$ as pictured in FIG. 7. A DC current or a pulsed current with an amplitude of 10 to 100 mA is injected into an end of the first PG in each mirror image paired configuration and exits through an end of the second PG. As a result, resistive heating is greatest in the rod-like portions $12r1$, $12r$ and effectively increases the temperature in the rod-like portions up to 275° C. or higher depending on the cross-sectional area of $12r1$, $12r2$, and the current magnitude. For example, a current of about 10 mA that is applied for a period of 1 minute to about 2 hours is sufficient to raise the temperature of $12r1$, $12r2$ by 250° C. considering a temperature coefficient of resistivity (TCR) for Au of 0.12%/degree. Preferably, the rod-like portions are heated to a temperature that exceeds the expected operating temperature of the final TAMR device. It should be understood that all of the PG structures in a TAMR array may be annealed simultaneously by this method to improve throughput.

In step 103, one or more rod-like portions may be probed with a second current substantially less in magnitude than the first current to provide a resistance measurement that quantifies the extent of the annealing in the previous step, and to give an estimate of critical dimension (cross-track width e). For example, if the first current is 10 mA, the second current may be in the range of 0.5 to 1 mA. Finally, in step 104, a reactive ion etch is performed to selectively remove the overcoat layer without damaging the cladding layer along a bottom surface of the rod-like portion of the PG. The leads may be removed in a subsequent step before the write pole is deposited. For example, the leads may be removed by ion beam etching.

Referring again to FIG. 7, the mirror image PG configuration formed during the TAMR fabrication sequence is shown from a top-down view and has an hour glass structure with a first PG with rod-like portion $12r1$ adjoining a second PG with rod-like portion $12r2$ along a plane 40-40 that bisects the dual PG structure along a cross-track direction. The first PG has a back end portion $12p1$ where a back side $12b1$ is connected by a first lead 31 to a power source (not shown). The second PG has a back end portion $12p2$ with a back side $12b2$ that is connected by a second lead 32 to the power source to complete a circuit and enable a current to flow through the hour glass structure during an annealing step 102 or probing step 103. Preferably, leads are attached to all PG back end portions in a plurality of dual PG mirror image structures in the TAMR array before proceeding to the next step in the anneal process sequence. The outline of the underlying waveguide layer is shown as a dashed rectangle and indicates a mirror image structure where plane 40-40 divides the waveguide layer into a first half 10*a* formed under a first PG comprised of $12r1$, $12p1$ and a second half 10*b* formed under a second PG comprised of $12r2$, $12p2$. Thus, during a final lapping step, the first waveguide section 10*a* and first PG will become part of a first TAMR head (not shown) while the second waveguide section 10*b* and second PG will become part of a second TAMR head.

Figure 8:
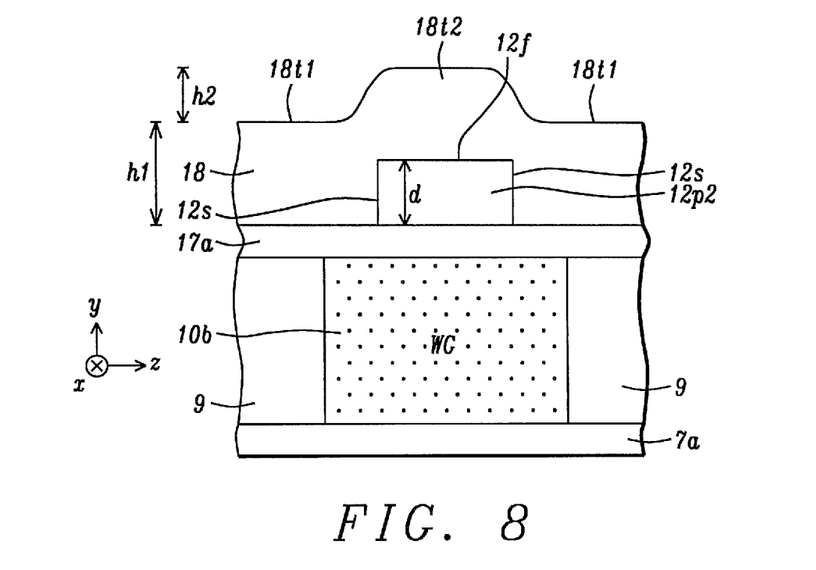
FIG. 8 is a cross-sectional view of a temporary overcoat layer formed on a PG structure during an annealing process of the present disclosure.

In FIG. 8, a cross-sectional view of the second PG in FIG. 7 is shown along a plane 20-20 after the leads are attached in step 100 and a conformal overcoat layer is deposited on the TAMR array in step 101. The overcoat layer 18 should be made of an insulator material such as silicon dioxide or tantalum oxide that can be selectively removed in a subsequent etch step without significantly affecting the thickness of first cladding layer 17*a*. The overcoat layer serves to dissipate heat during the annealing process and effectively holds the PG in place when the rod-like portions reach elevated temperatures during the first current injection. In the exemplary embodiment, overcoat layer has a thickness h1 and a top surface $18t1$ in regions above first cladding layer 17*a*. Furthermore, there is a top surface $18t2$ formed above a top surface $12f$ of PG back end portion $12p2$ that is located a distance h2 above top surface $18t1$. Generally, h1>h2 and h2 may approach zero when h1 is substantially greater than the down-track thickness d of PG portion $12p2$. When silicon oxide or tantalum oxide is used for the overcoat layer 18, and alumina is employed as the first cladding layer 17*a*, then a $CF_4$ RIE may be advantageously performed to selectively remove the overcoat layer without significantly eroding the underlying first cladding layer.

Figure 9:
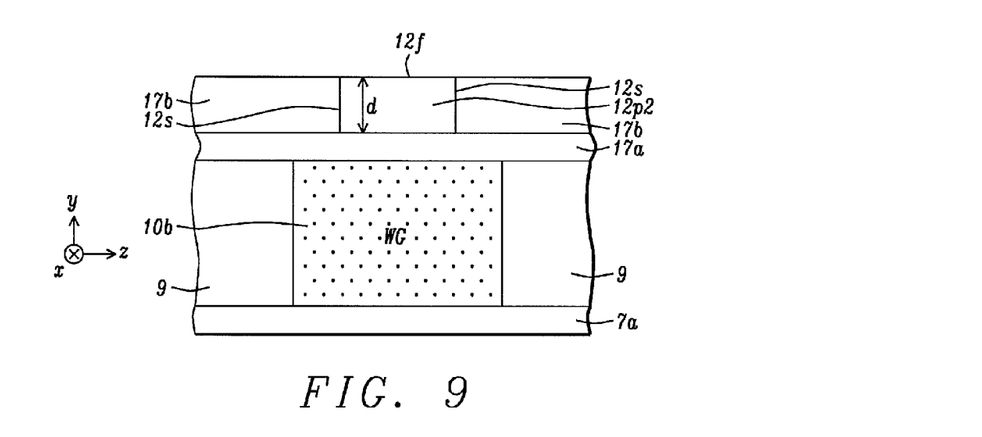
FIG. 9 is a cross-sectional view of the structure in FIG. 8 after removing the overcoat layer and depositing a second cladding layer adjacent to the PG sidewalls.

Once the leads are removed by ion beam etching, the fabrication of the TAMR write head may resume with conventional process steps. For example, the second cladding layer 17*b* may then be deposited to completely cover the dual PG mirror image structure in FIG. 7, and is simultaneously formed along sidewalls 12*s* of the back end PG portions. A planarization process such as chemical mechanical polishing (CMP) may be employed to form a top surface on cladding layer 17*b* that is coplanar with a top surface $12f$ of back end portion $12p2$ (and $12p1$) as shown in FIG. 9. A gap layer (layer 19 in FIG. 5) may then be deposited on the dual PG mirror image structure and is followed by well known patterning, etching, and deposition steps to form a write pole 14 within gap layer 19. After overlaying layers in the write head are laid down, the slider may be sliced along the plane where two ends of the rod-like portions in the dual PG mirror image structure are joined to form two TAMR heads from each dual PG mirror image structure. A lapping process is then used to form an ABS for each combined read head/write head.

To demonstrate the effectiveness of the annealing method of the present disclosure, a finite element method (FEM) simulation was performed based on a parabolic shaped PG design. This thermo-electric analysis is able to directly calculate the voltage drop (thus DC resistance) and temperature rise from the joule heating caused by current injection into a back end of a PG, and current flow through rod-like portions to a second terminal (back end of a second PG) in a dual PG configuration in a mirror image design similar to the one depicted in FIG. 7.

Figure 10:
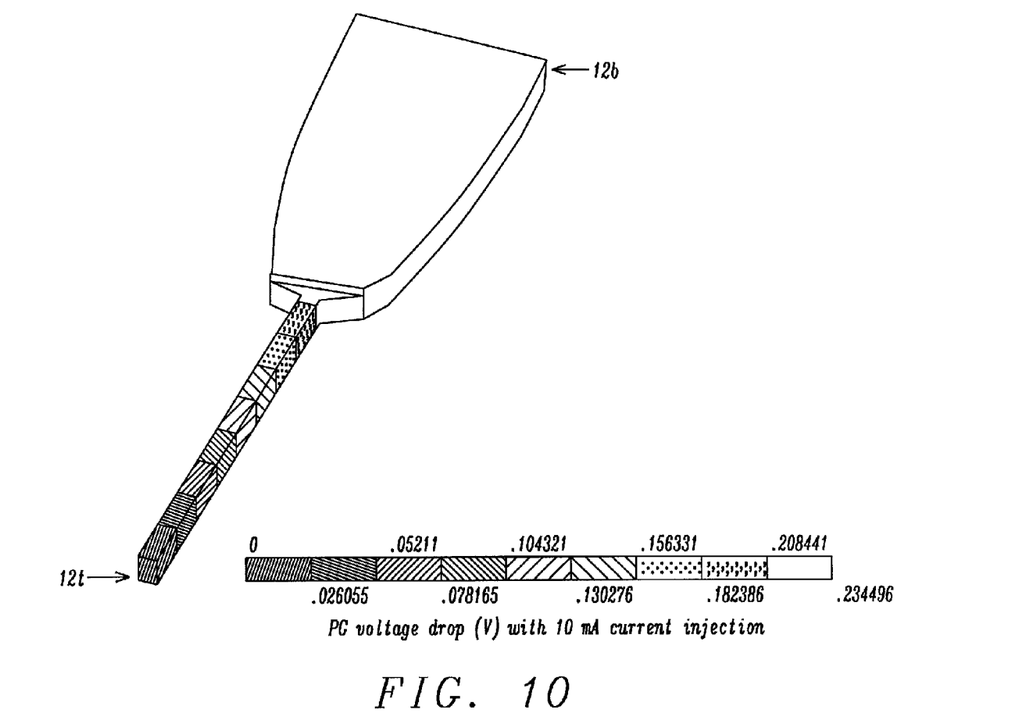
FIG. 10 shows an oblique view of a plasmon generator (PG) during simulation of an annealing process of the present disclosure wherein a voltage drop is shown in the rod shaped and parabola shaped portions of the PG during a 10 mA current injection.

Referring to FIG. 10, the voltage drop across a PG structure is shown under conditions for an annealing process of the present disclosure. Only one of the two plasmon generators in the mirror image configuration is depicted. At the end $12t$ of the rod-like portion, there is essentially no voltage drop. A maximum voltage drop of 0.234 volts is observed at a terminal side $12b$ of the PG. The simulated results are based on a PG made entirely of Au, a 10 mA current injection, PG length below the ABS of 1 micron, and a rectangular peg end with a 60 nm down-track thickness and a 40 nm cross-track width. DC resistance is estimated at 23.5 ohm with 2.35 mW power consumption.

Figure 11:
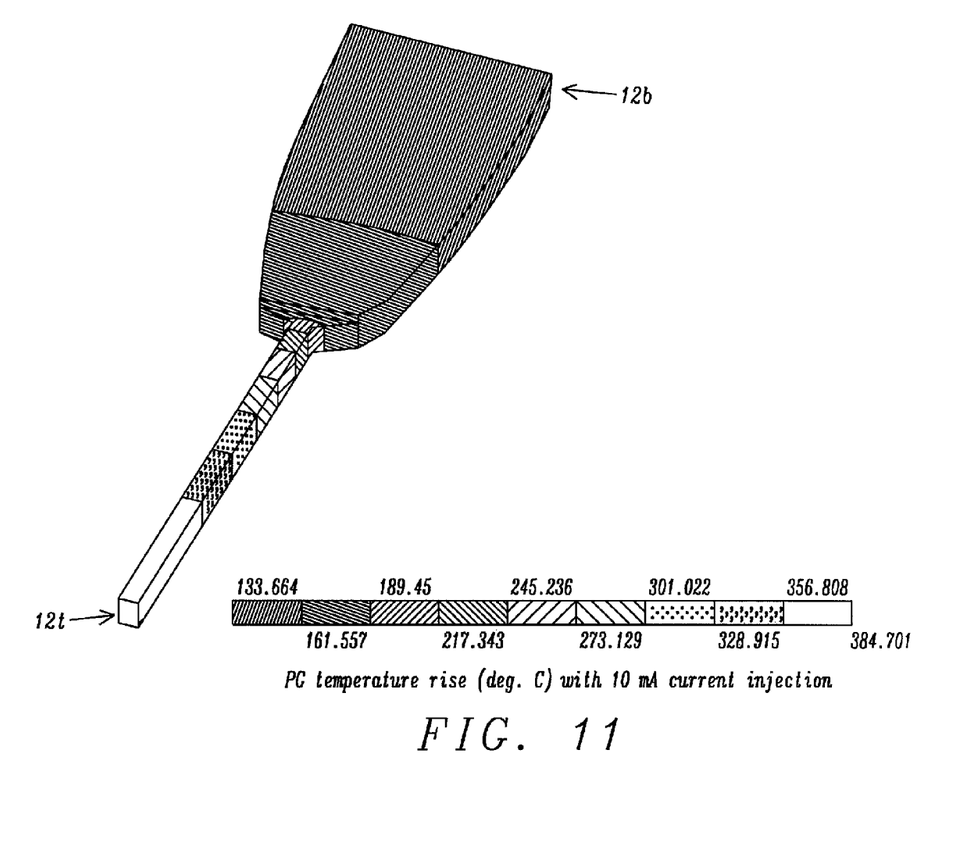
FIG. 11 illustrates a temperature rise in a simulated annealing process of FIG. 10 and shows the greatest heating near an ABS end of a rod shaped portion of the PG and substantially less heating in a back end portion of the PG.

In FIG. 11, the temperature rise in each portion of the PG in FIG. 10 is shown and indicates the largest temperature rise is at the end 12t of the rod-like portion. A smaller temperature increase of about 190° C. occurs near the neck of the rod-like portion (proximate to plane 24-24 in FIG. 4) because there is a certain amount of heat transfer into the adjoining parabola shaped portion. Thus, there is a temperature gradient with a decreasing temperature change as one moves from peg end 12t to back side 12b. The temperature increase is found to be substantially less in the parabolic shaped back end portion. Considering the temperature coefficient of resistivity (TCR) for Au of 0.12%/degree C, the actual input power under constant current mode will be 25% higher than previously mentioned. Therefore, the neck region of the rod-like section is expected to have a temperature rise of near 250° C. under a 10 mA current injection. If desired, even greater PG annealing temperatures can be realized with higher current injection or smaller volume in the rod-like portion, for example. An important feature in the PG annealing sequence as described herein is that the current injection in step 102 generates a temperature in the rod-like portion that exceeds the anticipated temperature during normal write operations once the TAMR head is completed. As a result, the PG physical structure is stabilized against deformities and performance degradation that occur in prior art TAMR designs.

The present disclosure has an advantage over prior art in that it provides a TAMR write head structure wherein localized annealing of a narrow rod-like portion of a plasmon generator is achieved without substantially raising the temperature in adjacent layers. The annealing process may be performed simultaneously in a plurality of write heads in a TAMR array on a slider by injecting a first current that passes through a dual PG mirror image configuration. The extent of the annealing may be detected in-situ by a second current to monitor a resistance drop across the PG. Annealed portions of a PG tend to have a larger grain size than in non-annealed regions and a more uniform grain size. The annealing method is compatible with other head fabrication processes and is preferably performed after the waveguide and plasmon generator are formed in a leading magnetics design, and prior to depositing a write pole on the optical components.

While this disclosure has been particularly shown and described with reference to, the preferred embodiment thereof, it will be understood by those skilled in the art that various changes in form and details may be made without departing from the spirit and scope of this disclosure.

We claim:

1. A method for providing localized annealing to a plasmon generator of a thermally assisted magnetic recording (TAMR) head that is formed on a slider, comprising:
   (a) providing an optical system with a stacked structure that comprises:
      (1) a waveguide that is designed to capture light energy from a light source and propagate the light energy toward an end of the waveguide at an air bearing surface (ABS), the waveguide has a top surface aligned in a lengthwise direction that is perpendicular to the ABS and toward a back end of the TAMR head;
      (2) a plasmon generator (PG) that has a bottom surface formed parallel to the waveguide top surface and separated therefrom by a first cladding layer; light energy from the waveguide couples to a plasmon mode of the PG and is propagated as a surface plasmon (SP) mode to the ABS where the SP mode is focused on a magnetic medium to provide spot heating during a write process; and
      (3) the first cladding layer formed between the waveguide and PG, the optical system is formed with a dual PG mirror image structure about a plane that approximates a final ABS position wherein an end of a first rod-like portion of a first PG adjoins an end of a second rod-like portion of a second PG along the plane, and back end portions of the first and second PG adjoin a second end of the first and second rod-like portions, respectively, at a first distance from the plane;
   (b) attaching a first lead to a back end portion of the first PG to form a positive terminal, and attaching a second lead to a back end portion of the second PG to form a negative terminal;
   (c) depositing an overcoat layer made of an insulation material on the slider; and
   (d) injecting a first current through the first lead that passes through the dual PG mirror image structure and exits through the second lead thereby causing resistive heating to locally anneal the rod-like portions of the first PG and second PG without substantially elevating a temperature in the back end portions or in adjacent regions of the optical system or TAMR head.

2. The method of claim 1 further comprised of injecting a second current through the first lead that passes through the dual PG mirror image structure and exits by way of the second lead, the second current is used to probe the dual PG mirror image structure to determine the extent of annealing achieved by the first current injection.

3. The method of claim 2 further comprised of selectively removing the overcoat layer with a reactive ion etch that does not significantly erode the first cladding layer.

4. The method of claim 3 further comprised of depositing a second cladding layer along sidewalls of the back end portions and to completely cover the rod-like portions, and then forming a write pole layer that contacts a top surface of the back end portions.

5. The method of claim 1 wherein the plasmon generator is made of Au, Ag, Cu, or AuCo.

6. The method of claim 3 wherein the first and second cladding layers are comprised of alumina, and the overcoat layer is made of silicon oxide or TaOx.

7. The method of claim 6 wherein the reactive ion etch comprises $CF_4$.

8. The method of claim 1 wherein the first current is a DC current or pulsed current with an amplitude of about 10 to 100 mA.

9. The method of claim 2 wherein the second current has an amplitude in the range of about 0.5 to 1 mA.

10. The method of claim 1 wherein the back end portions of the plasmon generators have a greater cross-sectional width and a greater down-track thickness than the first and second rod-like portions such that a first volume of a back end portion is substantially larger than a second volume of a rod-like portion.

11. The method of claim 1 wherein each of the back end portions has a parabolic shape formed proximate to the second end of a rod-like portion wherein opposing sides of the parabola shape have a greater separation in a cross-track direction with increasing distance from the second end as observed from a top-down view along a down-track direction.

12. The method of claim 8 wherein the first current raises a temperature in the rod-like portions of the dual PG mirror image structure by up to 250° C. or more such that the temperature achieved during the annealing step exceeds operational temperatures in the TAMR head after TAMR head fabrication is completed in subsequent steps.

13. A thermally assisted magnetic recording (TAMR) head structure that enables a plasmon generator component therein to be selectively annealed without substantially elevating a temperature in adjacent layers in the TAMR head, comprising:
- (a) an optical system with a stacked structure that is formed on a substrate and comprises:
  - (1) a waveguide that is designed to capture light energy from a light source and propagate the light energy toward an end of the waveguide at an air bearing surface (ABS), the waveguide has a top surface aligned in a lengthwise direction that is perpendicular to the ABS and toward a back end of the TAMR head;
  - (2) a plasmon generator (PG) that has a bottom surface formed parallel to the waveguide top surface and separated therefrom by a first cladding layer; light energy from the waveguide couples to a plasmon mode of the PG and is propagated as a surface plasmon (SP) mode to the ABS where the SP mode is focused on a magnetic medium to provide spot heating to facilitate a write process; and
  - (3) the first cladding layer formed between the waveguide and PG, the optical system is formed with a dual PG mirror image structure about a plane that approximates a final ABS position wherein an end of a first rod-like portion of a first PG adjoins an end of a second rod-like portion of a second PG along the plane, and back end portions of the first and second PG adjoin a second end of the first and second rod-like portions, respectively, at a first distance from the plane;
- (b) a first lead from a power source that is connected to a back end portion of the first PG to form a positive terminal, and a second lead from the power source that is attached to a back end portion of the second PG to form a negative terminal to complete a circuit that allows a current to pass through the dual PG mirror image structure and thereby anneals the rod-like portions as a result of resistive heating; and
- (c) an overcoat layer made of an insulation material that is formed on the first cladding layer and covers the dual PG mirror image structure.

14. The TAMR head structure of claim 13 wherein the substrate is a return pole, and a bottom surface of the waveguide contacts a top surface of the return pole.

15. The TAMR head structure of claim 13 wherein the first and second plasmon generators are made of Au, Ag, Cu, or AuCo.

16. The TAMR head structure of claim 13 wherein the first and second rod-like portions have a rectangular or square shape from a cross-sectional view along the plane.

17. The TAMR head structure of claim 13 wherein the first cladding layer is comprised of alumina, and the overcoat layer is made of silicon oxide or TaOx.

18. The TAMR head structure of claim 13 wherein the current is a DC current or pulsed current with an amplitude of about 10 to 100 mA.

19. The TAMR head structure of claim 13 wherein the back end portions of the plasmon generators have a greater cross-sectional width and a greater down-track thickness than the first and second rod-like portions such that a first volume of a back end portion is substantially larger than a second volume of a rod-like portion.

20. The TAMR head structure of claim 13 wherein each of the back end portions has a parabolic shape formed proximate to the second end of a rod-like portion wherein opposing sides of the parabola shape have a greater separation in a cross-track direction with increasing distance from the second end as observed from a top-down view along a down-track direction.

21. The TAMR head structure of claim 13 wherein each rod-like portion extends a distance of about 5 to 150 nm from the plane.

22. A method of fabricating a thermally assisted magnetic recording (TAMR) write head with a leading magnetics design, comprising:
- (a) providing a return pole on a substrate wherein the return pole has a pedestal structure having a top surface;
- (b) forming a waveguide layer that has a bottom surface contacting the top surface of the pedestal, and a top surface that extends in a lengthwise direction that is perpendicular to a first plane that is proximate to an eventual air bearing surface (ABS) position;
- (c) depositing a first cladding layer on the waveguide layer;
- (d) forming a dual plasmon generator (PG) mirror image structure on the first cladding layer wherein each PG has a rod-like portion with a first end that adjoins the first plane, and a back end adjoining a second end of the rod-like portion along a second plane formed parallel to the first plane;
- (e) annealing the rod-like portions of the dual PG mirror image structure by injecting a current that passes from a back side of a first PG to a back side of a second PG through a circuit that comprises two leads and a power source;
- (f) forming a second cladding layer on the first cladding layer and along sidewalls of the dual PG mirror image structure, the second cladding layer has a top surface that is coplanar with a top surface of the first PG and of the second PG;
- (g) forming a write pole on the dual PG mirror image structure such that a bottom or leading surface of the write pole contacts the top surface of the first PG and the top surface of the second PG; and
- (h) slicing the substrate along the first plane to form a first TAMR head comprising a first PG, and a second TAMR head comprising a second PG.

23. The method of claim 22 wherein the substrate is a read head in a combined read head/write head structure.

24. The method of claim 22 wherein the first and second plasmon generators are made of Au, Ag, Cu, or AuCo.

25. The method of claim 22 wherein the first and second rod-like portions have a rectangular or square shape from a cross-sectional view along the first plane.

26. The method of claim 22 wherein the current is a DC current or pulsed current with an amplitude of about 10 to 100 mA.

27. The method of claim 22 wherein the back end portions of the plasmon generators have a greater cross-sectional width and a greater down-track thickness than the first and second rod-like portions such that a first volume of a back end portion is substantially larger than a second volume of a rod-like portion.

28. The method of claim 22 wherein each of the back end portions has a parabolic shape formed proximate to the second end of a rod-like portion wherein opposing sides of the parabola shape have a greater separation in a cross-track direction with increasing distance from the second end as observed from a top-down view along a down-track direction.

29. The method of claim 22 wherein the rod-like portions and back end portions of the dual PG mirror image structure each have a bottom surface that is formed along a third plane which faces a top waveguide surface.

30. The method of claim 22 wherein the current raises a temperature in the rod-like portions of the dual PG mirror image structure to a temperature that exceeds an operational temperature in the first and second TAMRs.

* * * * *